United States Patent [19]

Enos

[11] 4,089,276
[45] May 16, 1978

[54] PORTABLE BUMPER PLATFORM

[76] Inventor: Ernest S. Enos, P.O. Box 547, Hughson, Calif. 95326

[21] Appl. No.: 785,737

[22] Filed: Apr. 8, 1977

[51] Int. Cl.² ............................................ A47B 23/00
[52] U.S. Cl. .................................... 108/44; 248/250; 5/119; 182/92
[58] Field of Search ................. 108/44, 152; 248/250; 5/119; 182/92; 280/163

[56] References Cited

U.S. PATENT DOCUMENTS

| 205,722 | 7/1878 | Brodie et al. | 248/250 X |
|---|---|---|---|
| 883,323 | 3/1908 | MacDuff | 248/250 |
| 2,228,203 | 1/1941 | Hoffman | 108/44 X |
| 2,394,447 | 2/1946 | Hemp | 108/44 X |
| 2,718,445 | 9/1955 | Wilson | 108/44 |
| 2,759,199 | 8/1956 | Wollam | 5/119 X |
| 3,295,473 | 1/1967 | Wentworth | 108/44 X |

FOREIGN PATENT DOCUMENTS

| 546,838 | 11/1922 | France | 248/250 |
|---|---|---|---|
| 186,296 | 11/1963 | Sweden | 248/210 |

Primary Examiner—Roy D. Frazier
Assistant Examiner—Peter A. Aschenbrenner
Attorney, Agent, or Firm—Daniel Jay Tick

[57] ABSTRACT

A pair of braces releasably maintain a pair of support members in horizontal position extending beyond the bumper of a truck, bus, or the like vehicle. The support members support a platform horizontally between them for a mechanic to facilitate work on the engine of the vehicle.

2 Claims, 5 Drawing Figures

PORTABLE BUMPER PLATFORM

BACKGROUND OF THE INVENTION

The present invention relates to a portable bumper platform. More particularly, the invention relates to a portable bumper platform for supporting a mechanic on the bumper of a truck, bus, or the like vehicle, to facilitate work on the engine thereof. The truck, bus, or the like, has a bumper with a main part extending substantially vertically and an upper lip extending inward toward the truck, bus, or the like, substantially horizontally, from the top edge of the main part of the bumper.

Objects of the invention are to provide a portable bumper platform of simple structure, which is inexpensive in manufacture, assembled and disassembled with facility, convenience and rapidity, stored in a minimum area, structurally strong, assembled and disassembled by anyone, with or without skills of any kind, and functions efficiently, effectively, reliably and safely to support a mechanic on the bumper of a truck, bus, or the like vehicle, to facilitate work on the engine thereof.

BRIEF DESCRIPTION OF THE DRAWINGS:

In order that the invention may be readily carried into effect, it will now be described with reference to the accompanying drawings, wherein.

DETAILED DESCRIPTION OF THE INVENTION

Figure 1:
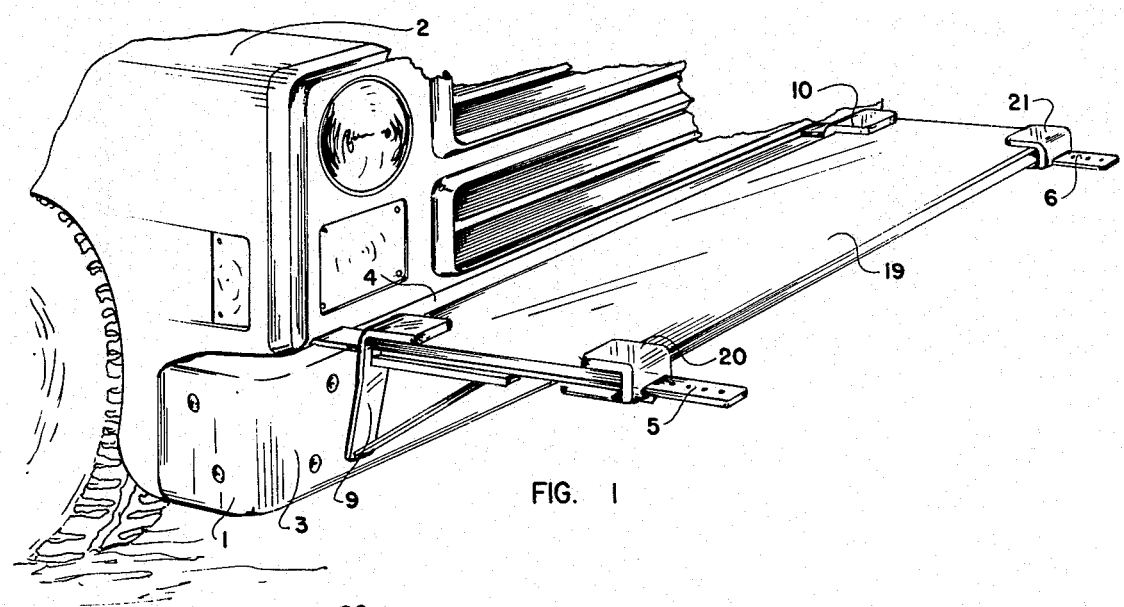
FIG. 1 is a perspective view of an embodiment of the portable bumper platform of the invention assembled and mounted on the bumper of a truck.

The portable bumper platform of the invention supports a mechanic on the bumper 1 (FIGS. 1 and 2) of a truck, bus, or the like vehicle 2 (FIG. 1), to facilitate work on the engine thereof. The truck, bus, or the like 2 has the bumper 1 with a main part 3 extending substantially vertically and an upper lip 4 extending inward toward the truck, bus, or the like, substantially horizontally from the top edge of the main part of the bumper, as shown in FIGS. 1 and 2.

Figure 2:
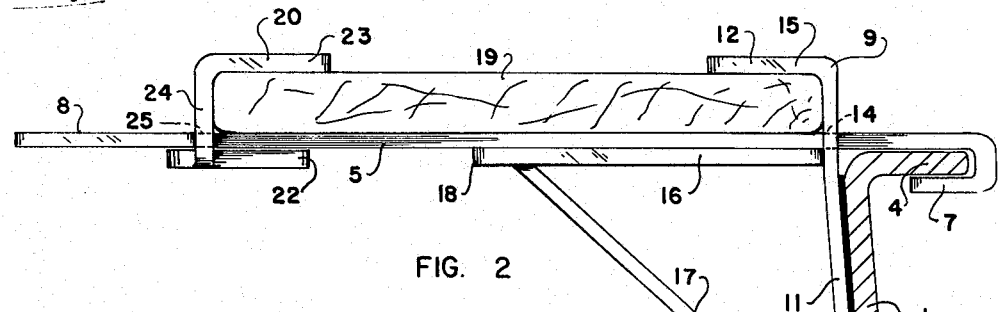
FIG. 2 is a view, on an enlarged scale, partly in section, of the embodiment of FIG. 1.
Figure 5:
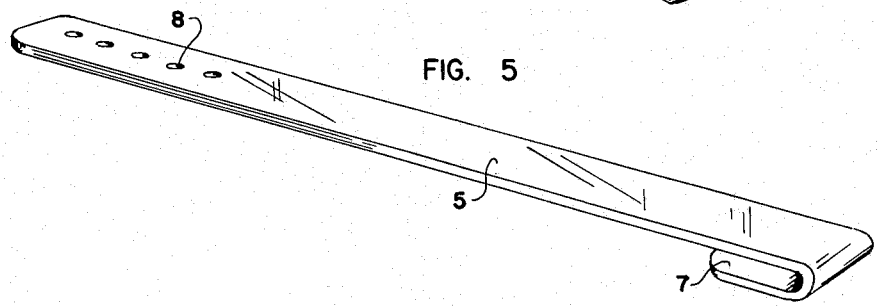
FIG. 5 is a perspective view, on an enlarged scale, of an embodiment of a support member of the portable bumper platform of the invention.

The portable bumper platform of the invention comprises a pair of elongated plank-type support members 5 and 6 (FIGS. 1, 2 and 5). Since the support members 5 and 6 are identical, only the support member 5 will be described herein with reference to FIGS. 2 and 5.

The support member 5 has spaced opposite first and second ends 7 and 8. The first end 7 is bent over on itself to form a substantially flat U to accommodate the upper lip 4 of the bumper 1 of the vehicle 2, as shown in FIG. 2.

A pair of braces 9 and 10 (FIGS. 1, 2 and 4) releasably maintain the support members 5 and 6, respectively, in substantially horizontal position extending beyond the bumper 1 of the vehicle 2. Since the braces 9 and 10 are identical, only the brace 9, shown in FIGS. 2 and 4, is described in detail herein.

The brace 9 comprises a main plank-type part 11 having spaced opposite first and second ends 12 and 13. The main part 11 is folded substantially perpendicularly to itself and the first end 12 thereof, as shown in FIGS. 2 and 4. The main part 11 has a slot 14 formed therethrough substantially parallel to the folded part 15 thereof and spaced in proximity with said folded part for accommodating the support member 5 or the support member 6. In the illustrated example, the slot 14 of the main part 11 of the brace 9 accommodates the support member 5.

Figure 4:
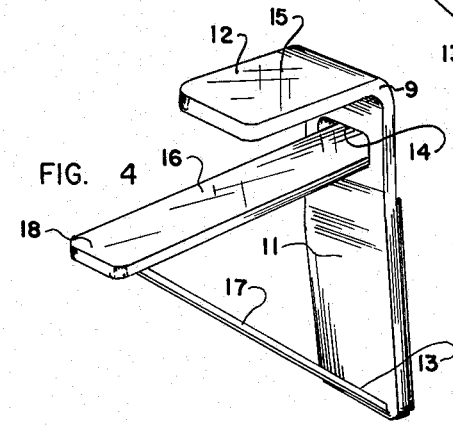
FIG. 4 is a perspective view, on an enlarged scale, of an embodiment of a brace of the portable bumper platform of the invention.

A support part 16 extends substantially perpendicularly from the main part 11, next-adjacent the slot 14, and closer to the second end 13 than said slot, as shown in FIGS. 2 and 4. A brace 17 extends from the second end 13 of the main part 11 to the free end 18 of the support part 16, as shown in FIGS. 2 and 4.

The main part 11 of the brace 9 and the main part of the brace 10 abut the main part 3 of the bumper 1 with the support part 16 of the brace 9 and the support part of the brace 10 extending away from said bumper and supporting the support members 5 and 6, respectively, as shown in FIGS. 1 and 2. The support member 5 is hooked at its first end 7 to the upper lip 4 of the bumper and the support member 6 is hooked at its first end to said upper lip of said bumper. The support members 5 and 6 thus support a platform 19 extending substantially horizontally between them (FIGS. 1 and 2).

Figure 3:
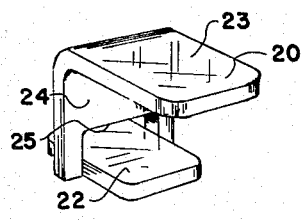
FIG. 3 is a perspective view, on an enlarged scale, of an embodiment of a clamp of the portable bumper platform of the invention.

A pair of clamps 20 and 21 are provided (FIGS. 1 to 3). Since the clamps 20 and 21 are identical, only the clamp 20 is described in detail herein.

The clamp 20 is of substantially plank-type, substantially square configuration, having a pair of spaced substantially parallel arms 22 and 23 and a head 24 joining the arms, as shown in FIGS. 2 and 3. A slot 25 is formed through the head 24 next-adjacent the arm 22 for accommodating the support member 5 or 6. In the illustrated example, the slot 25 accommodates the support member 5.

The clamps 20 and 21 releasably clamp the platform 19 between the support members 5 and 6, respectively, and the other arm 23 of the clamp 20 as well as the other of the clamp 21, in the manner shown in FIGS. 1 and 2. The braces 9 and 10 releasably clamp the platform 19 between the support members 5 and 6 and the folded first end 15 of the brace 9 and the folded first end of the brace 10, respectively.

While the invention has been described by means of a specific example and in a specific embodiment, I do not wish to be limited thereto, for obvious modifications will occur to those skilled in the art without departing from the spirit and scope of the invention.

I claim:

1. A portable bumper platform for supporting a mechanic on the bumper of a truck, bus, or the like, to facilitate work on the engine thereof, the truck, bus, or the like, having a bumper with a main part extending substantially vertically and an upper lip extending inward toward the truck, bus, or the like, substantially horizontally, from the top edge of the main part of the bumper, said portable bumper platform comprising a pair of elongated plank-type support members having spaced opposite first and second ends, the first end of each of the support members being bent over on itself to form a substantially flat U to accommodate the upper lip of the bumper of the vehicle; and a pair of braces for releasably maintaining the support members in substantially horizontal position extending beyond the bumper of the vehicle, each of said braces comprising a main plank-type part having spaced opposite first and second ends and being folded substantially perpendicularly to itself at the first end thereof, said main part having a slot formed therethrough substantially parallel to the folded part thereof and spaced in proximity therewith for accommodating a support member, a support part extending substantially perpendicularly from the main part next-adjacent the slot and closer to the second end than said slot and bracing means extending from the second end of the main part to the free end of the support part whereby in position the main part of each of the braces abuts the main part of the bumper with the support part of each of the braces extending away from the bumper and supporting a corresponding one of the support members hooked at its first end to the upper lip of the bumper whereby said support members support a platform extending substantially horizontally between them.

2. A portable bumper platform as claimed in claim 1, further comprising a pair of clamps each of substantially plank-type substantially square U configuration having a pair of spaced substantially parallel arms and a head joining the arms and substantially perpendicular thereto and having a slot formed therethrough next-adjacent one of the arms for accommodating a support member, each of said clamps releasably clamping the platform between the corresponding one of the support members and the other arm thereof and each of the braces releasably clamping said platform between the corresponding one of the support members and the folded first end thereof.

* * * * *